United States Patent [19]

Eguchi

[11] Patent Number: 5,596,444
[45] Date of Patent: Jan. 21, 1997

[54] OPTICAL APPARATUS HAVING LASER BEAM DIAMETER VARIABLE ACCORDING TO IMAGE DATA

[75] Inventor: Tatsuya Eguchi, Toyohashi, Japan

[73] Assignee: Minolta Camera Kabushiki Kaisha, Osaka, Japan

[21] Appl. No.: 203,008

[22] Filed: Feb. 28, 1994

[30] Foreign Application Priority Data

Mar. 2, 1993 [JP] Japan ..................................... 5-041278
Mar. 8, 1993 [JP] Japan ..................................... 5-046340

[51] Int. Cl.⁶ .................................................. G02B 26/08
[52] U.S. Cl. .......................... 359/210; 359/216; 359/217; 359/218; 358/296; 347/253; 250/235
[58] Field of Search ..................................... 359/209–210, 359/212–221; 250/234–236, 205; 347/251–255, 246–247, 248–250; 358/296, 298, 300, 302

[56] References Cited

U.S. PATENT DOCUMENTS 4,198,154  4/1980  Masegi et al. .
4,264,120  4/1981  Uchiyama et al. .
4,573,787  3/1986  Sanbayashi et al. .
4,763,134  8/1988  Murahashi et al. ...................... 347/253
4,768,043  8/1988  Saito et al. .
4,999,513  3/1991  Ito et al. ................................. 356/442
5,233,368  8/1993  Yamanaka et al. .
5,325,122  6/1994  Hattori et al. ........................... 346/160

FOREIGN PATENT DOCUMENTS

60-68316    4/1985   Japan .
61-277260  12/1986   Japan .
2-72979     3/1990   Japan .

Primary Examiner—James Phan
Attorney, Agent, or Firm—Price, Gess & Ubell

[57] ABSTRACT

Image data input from a host computer is converted into data BDATA corresponding to a beam diameter at an image control circuit. BDATA is input into a voice coil 21 driving a collimator lens through a collimator lens driving circuit 3, and the diameter of a laser beam is thus determined. Meanwhile, BDATA is input to a laser beam driving circuit 2 together with a signal LDATA controlling light emission from a laser diode. The laser diode is driven at an intensity corresponding to the beam diameter based on BDATA and LDATA at laser driving circuit 2. An optical apparatus capable of reproducing an accurate dot diameter according to a beam diameter is provided as a result.

13 Claims, 11 Drawing Sheets

| BEAM DIAMETER | ○ | · | · | • | ● | ● | ● | ● |
|---|---|---|---|---|---|---|---|---|
| BDATA | 000 | 111 | 110 | 101 | 100 | 011 | 010 | 001 |
| SIZE(μ) | 0 | 30 | 35 | 40 | 45 | 50 | 55 | 60 |

FIG. 4b

MAIN SCANNING DIRECTION

| ΔX [μm] | 0 | 0.87 | 1.28 | 1.62 | 1.93 | 2.23 | 2.51 | |
|---|---|---|---|---|---|---|---|---|
| D [μm] | 30 | 35 | 40 | 45 | 50 | 55 | 60 | |
| BDATA B0 | 1 | 0 | 1 | 0 | 1 | 0 | 1 | 0 |
| BDATA B1 | 1 | 1 | 0 | 0 | 1 | 1 | 0 | 0 |
| BDATA B2 | 1 | 1 | 1 | 1 | 0 | 0 | 0 | 0 |
| I [mA] | 48 | 49 | 51 | 53 | 57 | 61 | 66 | 0 |

THRESHOLD LEVEL FLUCTUATION

STARTING POSITION FOR WRITING IMAGE

OPTICAL APPARATUS HAVING LASER BEAM DIAMETER VARIABLE ACCORDING TO IMAGE DATA

BACKGROUND OF THE INVENTION

1. Field of the Invention

The present invention relates generally to optical apparatuses for processing image data with a laser beam, and more specifically, to an optical apparatus having a laser beam diameter variable according to image data.

2. Description of the Related Art

An example of an optical apparatus of interest to the present invention is disclosed in Japanese Patent Laying Open No. 61-277260 or Japanese Patent Laying Open No. 2-72979. According to these documents, the spot diameter of a laser beam is changed for improving the tone of an image with a reduced number of pixels. The technique can control the beam diameter on a one-by-one pixel basis. As a result, an image nominally having a pixel density of 400 DPI can apparently correspond to an image produced by a printer having a resolution of 800 DPI class. In addition, the memory of the printer is saved.

The memory saving will be described. For a page memory of size A4, for example, a usual laser printer requires about 1.8 MB memory capacity at an image density of 400 DPI. As the pixel density doubles to 800 DPI, the necessary page memory will be four times as large, in other words, about a capacity of 7.2 MB. Prices of memories have fallen in recent years, but a large amount of memories as such increases load on a central processing unit (CPU). As a result, the processing speed of the controller of the printer slows down.

Meanwhile, for a laser printer having a variable beam diameter, it is a different story. If, for example, the beam diameter is controlled in 8 ($=2^3$) steps, the memory capacity needs only be about three times as large, i.e. 5.4 MB. Such control results in an image having a tone of 800 DPI class, and the processing speed increases as compared to the case of simply increasing resolution.

In a printer having a variable laser beam diameter as described-above, the peak value of Gaussian distribution of a beam changes when the diameter of the beam is altered. Accordingly, in the electrophotographic system, the quantity of light per unit area of the beam is changed. As a result, the amount of charge removed per unit area is changed depending upon the diameter of the beam, and the amount of the sticking toner per unit area will change as a result. More specifically, when the diameter of a beam on an image is changed, the larger the beam diameter is, thinner will be sticking of toner.

Therefore, when a bold line is reproduced with a large diameter beam, the bold line is reproduced onto paper in low density.

Such a printer with a variable laser beam diameter as described above defines a timing for writing an image with an SOS (Start of Scan) sensor. In the laser printer, detection by the SOS sensor is generally not performed until the quantity of light from laser diode emitting a laser beam is stable. Therefore, as disclosed in U.S. Pat. No. 4,264,120, for example, a forced light emitting timing for a laser diode is set earlier.

As disclosed in the above U.S. patent, however, even if SOS detection is performed after stabilizing the quantity of light emitted from the laser diode, in a laser printer which reproduces half tone images by changing the beam diameter, changing the beam diameter on the SOS sensor can shift the starting position of writing an image as a result.

Figure 15A:
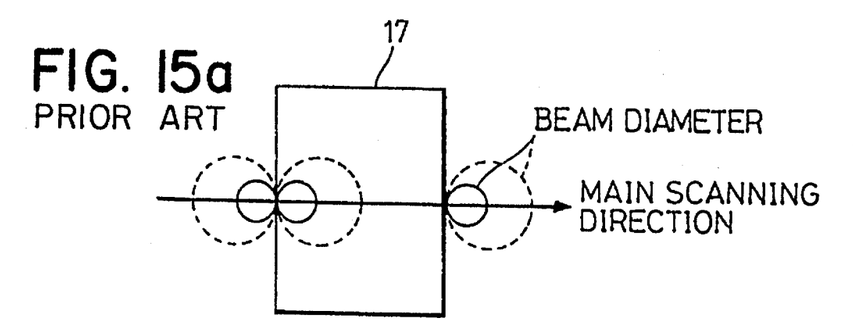
FIGS. 15a–15c are representations for use in illustration of problems associated with a conventional technique.
Figure 15B:
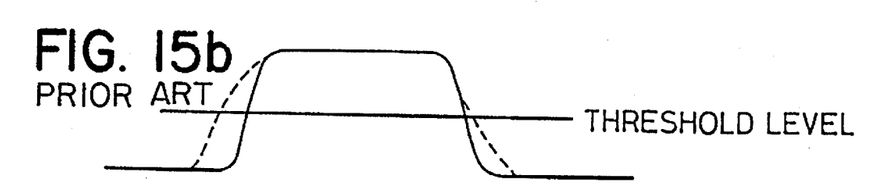
Figure 15C:
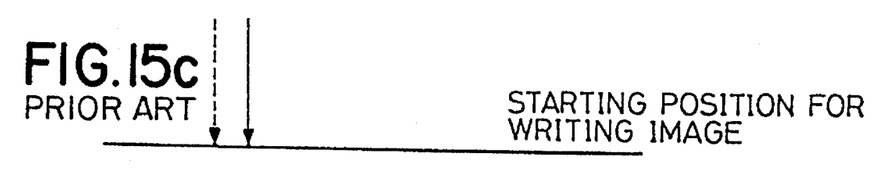

This will be described in conjunction with FIGS. 15a–15c. FIGS. 15a–15c are representations for use in illustration of (a) the positional relation between SOS sensor 17 defining a writing timing for an image in a main scanning direction and a laser beam coming therein, (b) the relation between waveforms of the output of the SOS sensor and threshold levels for producing an image writing position timing, as well as (c) resultant starting positions of writing an image. In FIG. 15, the dotted line corresponds to a large beam diameter, while the solid line corresponds to a small beam diameter. The image writing starting positions are shifted from each other between the larger beam diameter and smaller beam diameter as illustrated at (c). As a result, the picture quality degrades.

SUMMARY OF THE INVENTION

It is an object of the invention to eliminate troubles associated with change of a beam diameter in an optical apparatus having a variable laser beam diameter.

Another object of the invention is to provide an optical apparatus such as a laser printer permitting an accurate dot diameter to be reproduced depending upon a beam diameter.

Another object of the invention is to provide an optical apparatus such as a laser printer free from degradation of picture quality even if a beam diameter is changed.

The above-described objects of the invention are achieved by changing the intensity of a beam simultaneously with changing the diameter of the beam. More specifically, if the beam intensity is changed accordingly at the time when the beam diameter is changed, the beam diameter can be changed with the peak of the distribution of the intensity of the beam being unaltered. Since it is possible to reproduce an accurate dot diameter based on a beam diameter, there will arise no problem associated with changing the diameter.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, preferred embodiments of the invention will be described in conjunction with the accompanying drawings.

Figure 1:
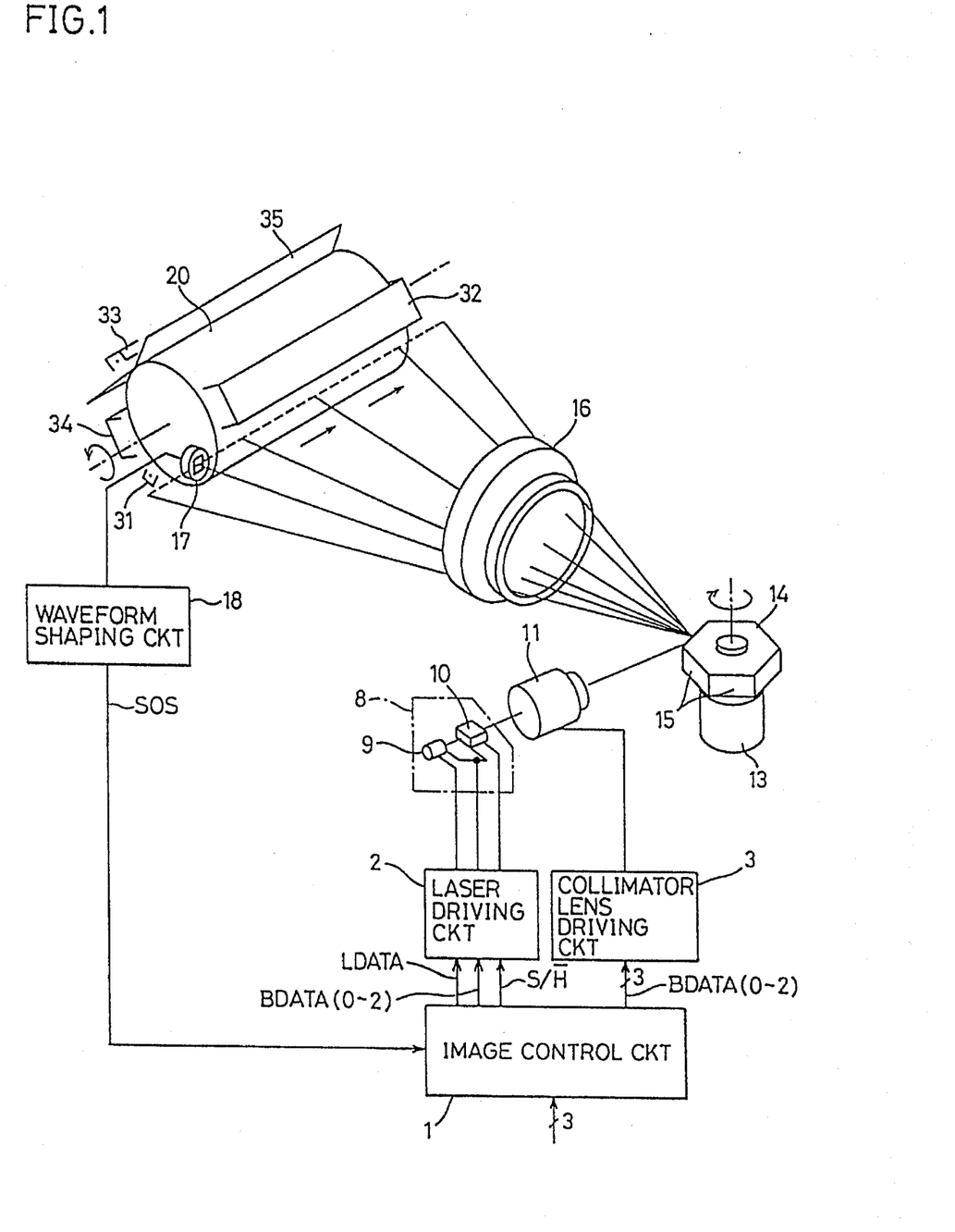
FIG. 1 is a view schematically showing the structure of a printer head which is an application of the present invention.

FIG. 1 is a view schematically showing the structure of a print head having a variable beam diameter to which the present invention is applied. Referring to FIG. 1, the print head includes an LD package 8 having a laser diode 10 emitting a laser beam and a pin diode 9 connected thereto, a collimator lens 11 for changing the diameter of laser beam output from LP package 8, and a polygon mirror 14 for deflecting the laser beam output from collimator lens 11. Polygon mirror 14 having a plurality of mirror surfaces 15 is rotated by a polygon motor 13 in the direction indicated by the arrow in the figure. The laser beam deflected by polygon mirror 14 is passed through fφ lens 16 and forms a latent electrostatic image on a photoreceptor 20 according to image data.

Provided around photoreceptor 20 are a charger 31, a developing device 32 developing an exposed portion and applying toner, a transfer charger 33 transferring the toner onto a sheet of copy paper 35, and a cleaner 34 for removing excess toner in this order.

When a latent electrostatic image is formed on photoreceptor 20, a laser beam comes into SOS sensor 17 by rotation of polygon mirror 14, then scans photoreceptor 20 in a scanning direction indicated by the arrow in the figure. Output data from SOS sensor 17 is sent to a waveform shaping circuit 18. LD package 8 is driven by a laser driving circuit 2, and collimator lens 11 is driven by a collimator lens driving circuit 3. Laser driving circuit 2 and collimator lens driving circuit 3 are controlled by an image control circuit 1 provided with image data.

Figure 2:
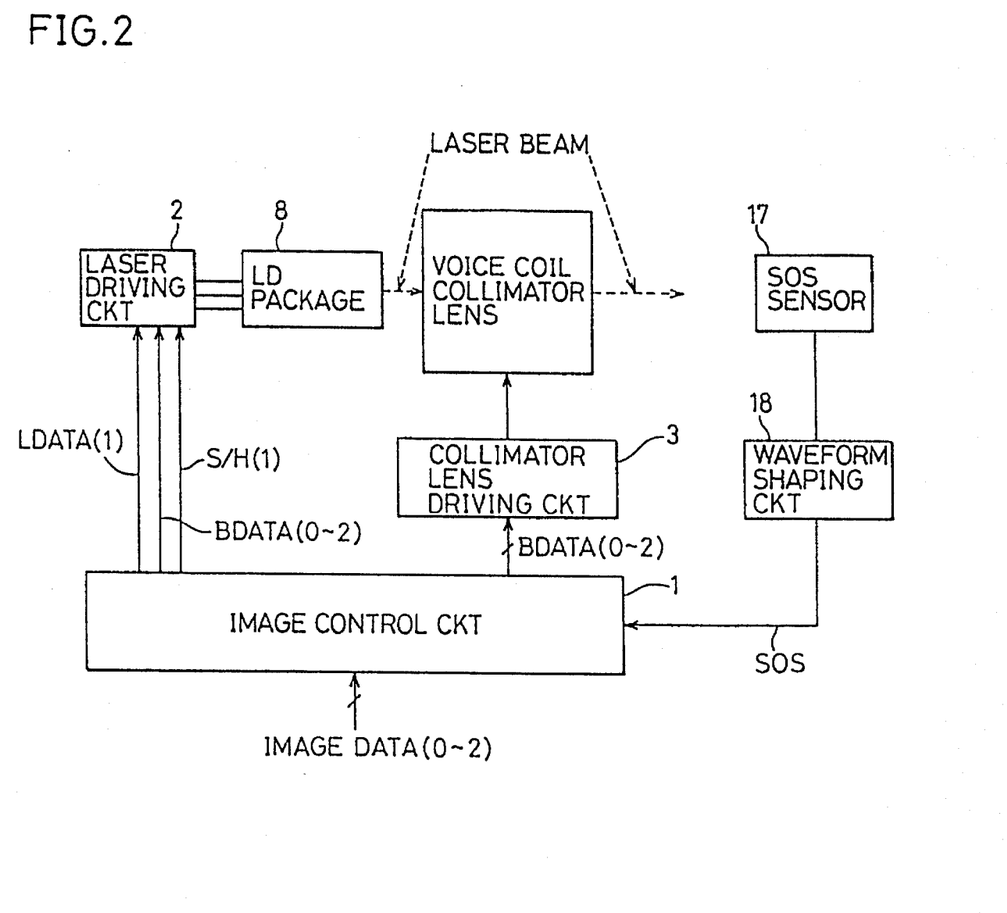
FIG. 2 is a block diagram showing a control portion in the printer head shown in FIG. 1.

FIG. 2 is a block diagram showing an essential part of a control portion in the print head shown in FIG. 1. Referring to FIG. 2, the control portion of the print head includes image control circuit 1 provided with 3-bit image data (0-2) from a host computer which is not shown, laser driving circuit 2 driving LD package 8, collimator lens driving circuit 3 driving collimator lens 11, and waveform shaping circuit 18 for shaping the waveform of an output from SOS sensor 17. Image control circuit 1 transmits signals LDATA, S/H and BDATA to laser driving circuit 2 in order to form an image on the photoreceptor. Signals LDATA and BDATA correspond to input image data, and signal S/H indicates a writing circle for image. 3-bit signal BDATA is output to collimator lens driving circuit 3 from image control circuit 1 in order to change the diameter of a laser beam. The output from SOS sensor 17 has its waveform shaped at waveform shaping circuit 18 and input to image control circuit 1 as a signal SOS. In response to signal SOS, signals LDATA, S/H and BDATA are output to laser driving circuit 2 from image control circuit 1.

Figure 3:
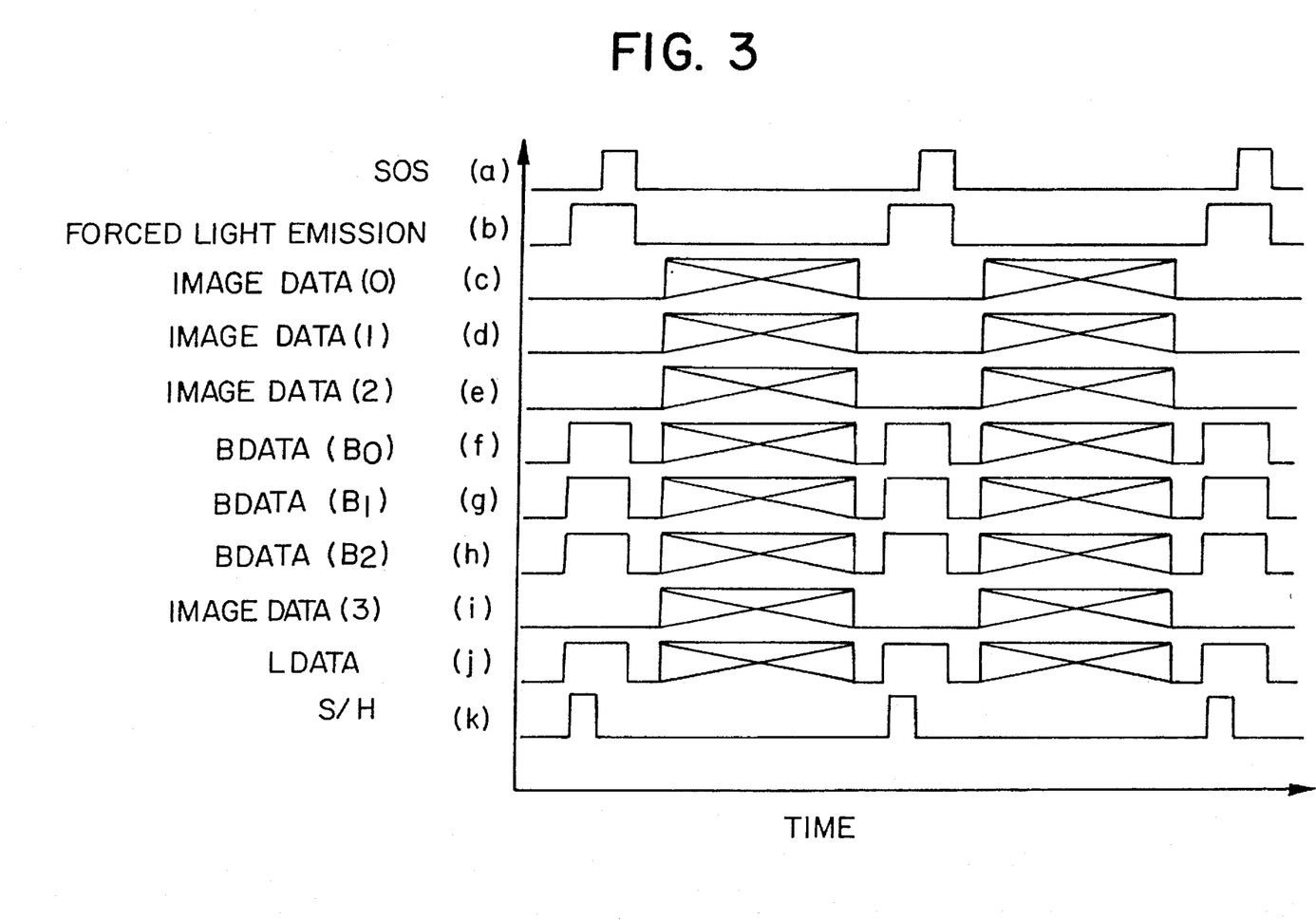
FIG. 3 is a timing chart for use in illustration of the image control circuit shown in FIG. 2.

The content of control by image control circuit 1 will be described in conjunction with FIG. 3 showing a timing chart for data input/output to/from image control circuit 1. Image data (0-2) which corresponds to beam diameter data for a laser beam to be emitted is input to image control circuit 1 from the host computer which is not shown.

Meanwhile, image data (3) is produced by ORing image data (0-2) in synchronization with signal SOS, and after the elapse of a prescribed time period from detection of signal SOS, a forced light emitting signal for forced emission of a laser beam is generated in order to detect the next signal SOS.

Image data (0-2) is sent to laser driving circuit 2 and collimator lens driving circuit 3 as BDATA ($B_2$, $B_1$, $B_0$), and collimator lens driving circuit 3 determines the position to determine a beam diameter.

In order to cause emission of a laser beam having a fixed diameter on the SOS sensor and to cause emission of a laser beam based on image data (3), the logical sum of the forced light emitting signal and image data (3) are sent to laser driving circuit 3 as LDATA. More specifically, when either image data (3) or the forced light emitting signal is at "1", LDATA=1 holds. Meanwhile, when the forced light emitting signal is output, since BDATA is all at "1", a minimum beam diameter is selected as will be described later. Thus, the timing position for writing an image on photoreceptor 20 will not be shifted.

Laser driving circuit 2 responds to LDATA and BDATA as will be described later in detail, and drives laser diode 10 in LD package 8. Also during the forced light emitting signal being output, signal S/H is output from the image control circuit. During this period, the laser power is sampled by pin diode 9 within the LD package and is kept at a constant level.

Now, description follows on 3-bit beam diameter data BDATA ($B_2$, $B_1$, $B_0$) output to the collimator lens driving circuit from image control circuit 1 and the size of beam diameters output at the time. In a usual printer, the beam diameter is not controlled and a beam is controlled with 1-bit data. More specifically, a location without data is indicated as "0", for example, while a location with data as "1".

Figure 4A:
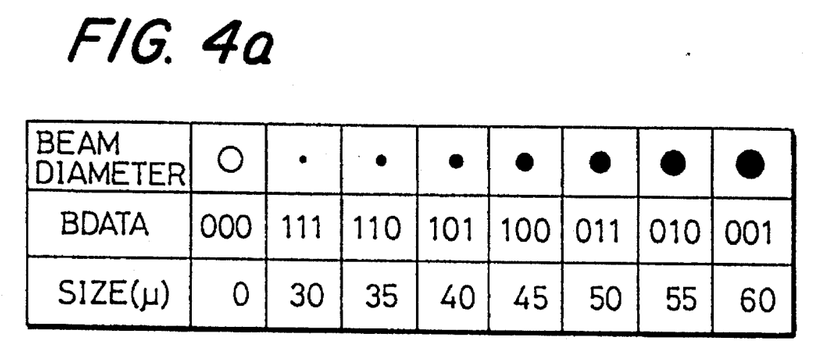
FIGS. 4a and 4b are representation for use in illustration of the relation between laser beam diameters and corresponding 3-bit image data.
Figure 4B:
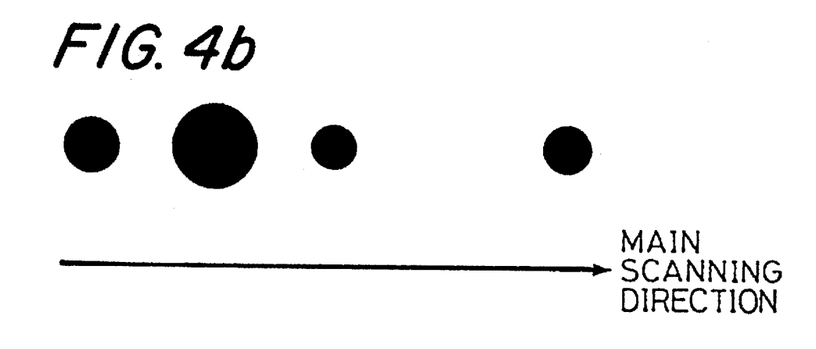

Meanwhile, in a printer capable of controlling a beam diameter according to the invention, as illustrated in FIG. 4(A), beam diameters correspond to data BDATA. More specifically, as illustrated in FIG. 4(B), when a beam is formed at a diameter of 50 μm→60 μm→30 μm 0.→none→35 μm on photoreceptor 20, for example, BDATA ($B_2$, $B_1$, $B_0$) will be changed in the order (1, 1, 0,)→(1, 0, 0)→(1, 1, 1)→(0, 0, 0)→(0, 1, 1).

Figure 5:
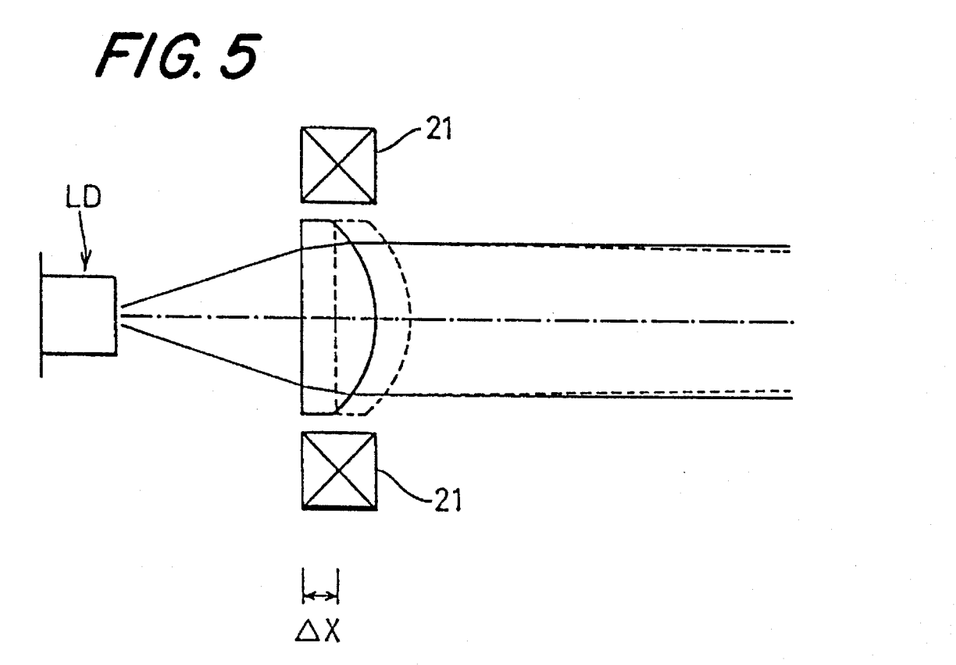
FIG. 5 is a diagram showing a mechanism for changing a beam diameter.

Now, a mechanism for changing the beam diameter will be described in conjunction with FIG. 5. Collimator lens 11 is moved in the direction of the optical axis using a voice coil 21. A well-known mechanism in a pickup device for an optical disk may be employed for the moving mechanism.

When collimator lens 11 is at the solid line position in the figure, the laser beam has a minimum beam diameter $D_0$ on photoreceptor 20. Moving collimator lens 11 by Δx with the voice coil to the dotted line position by results in defocus on photoreceptor 20 and the beam diameter is increased. At the time, the following relation is established:

$$D(\Delta x) = D_0 \sqrt{1 + \{4\lambda (f/f_{c0})^2 \Delta x/\pi D_0^2\}^2}$$

where

λ=oscillation wave length of laser diode, f: focal length of scanning optical system (fθ lens)
$f_{co}$=focal distance of the collimator lens.
Now, for λ=780 nm, f=150 mm, $f_{co}$=6.0 mm, and $D_0$=30 μm, the following expression holds:

$$D = 0.03 \sqrt{1 + 4.76 \times 10^5 \cdot \Delta_x^2} \quad (\text{mm})$$

Figure 6:
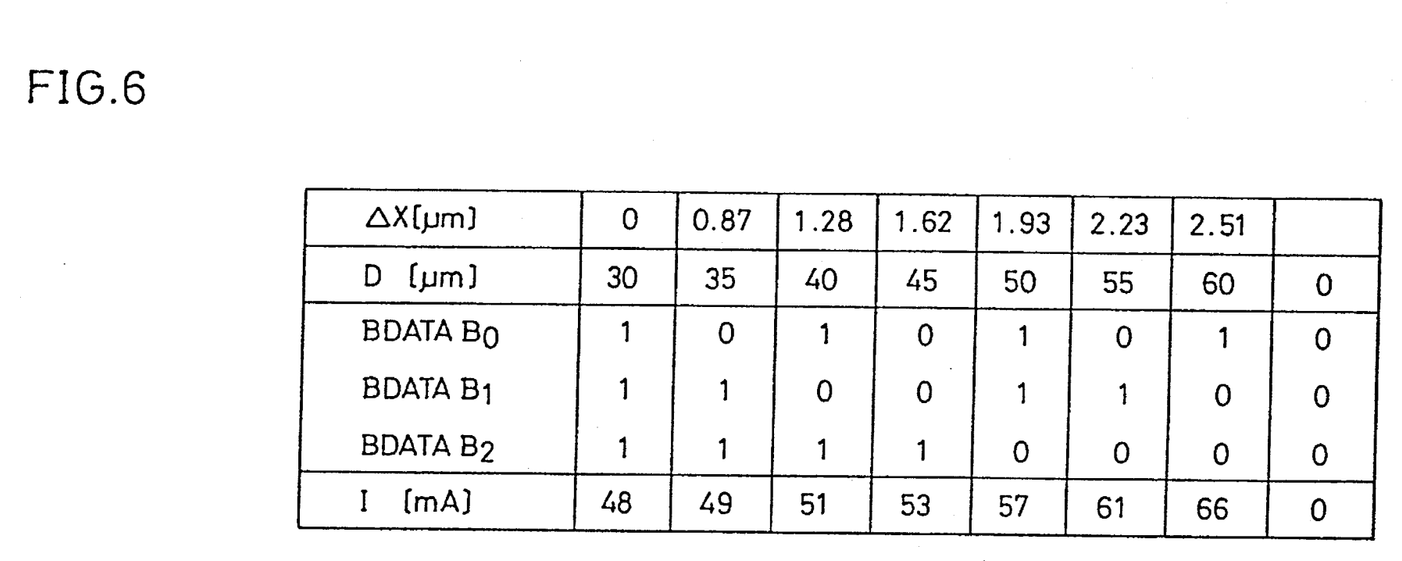
FIG. 6 is a table showing the relation between image data, beam diameters and corresponding laser diode driving currents.

The relation between Δx and D is set forth in FIG. 6.

More specifically, shifting the collimator lens as illustrated in FIG. 6 can shift the beam diameter in the range from 30 μm to 60 μm.

Note that shown in FIG. 6 are various beam diameters and current values I for emitting laser beams having intensities necessary for the beam diameters which will be described later.

Figure 7:
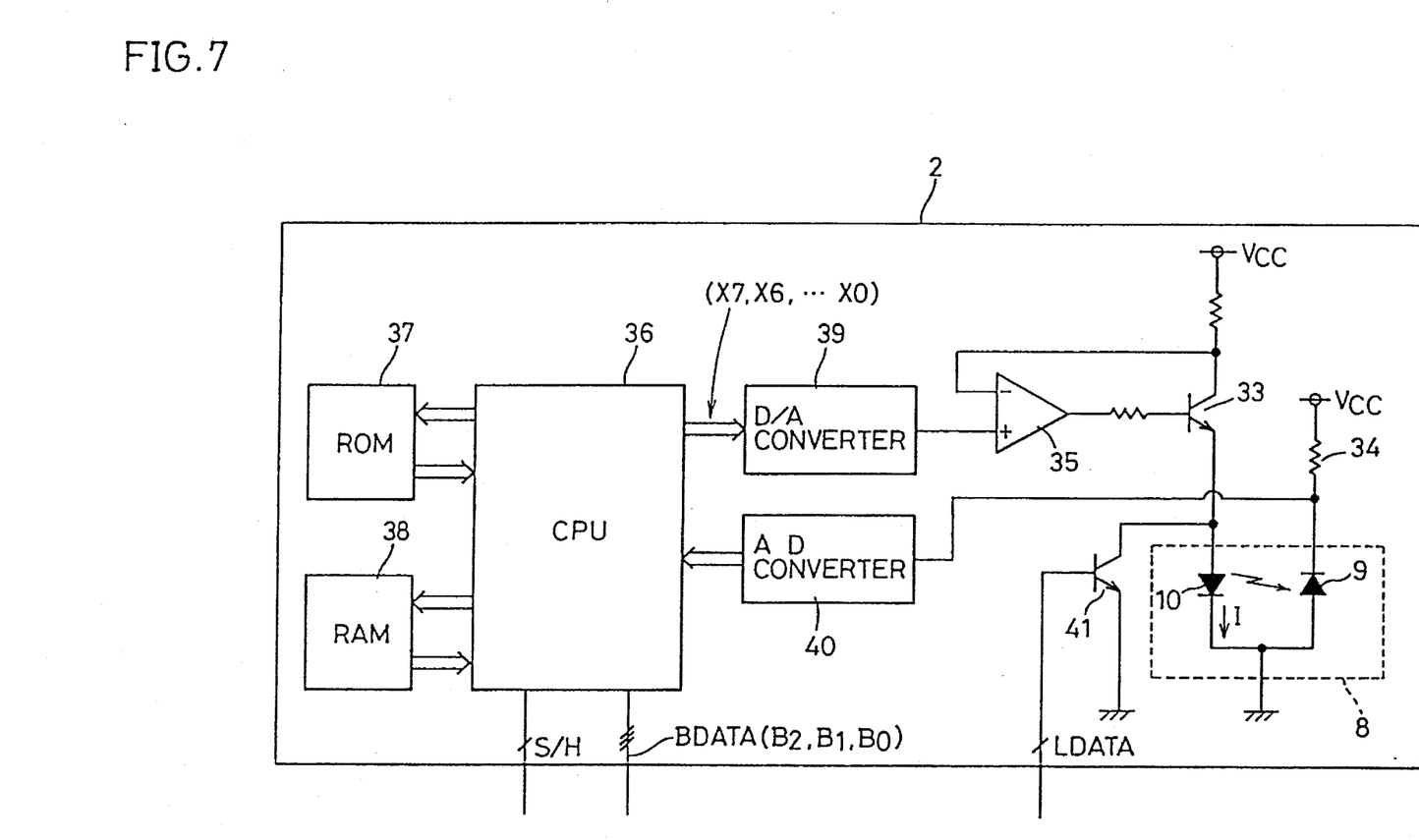
FIG. 7 is a circuit diagram showing in detail a laser beam driving circuit.

Now, how the beam intensity is set will be described. FIG. 7 is a circuit diagram showing in detail laser driving circuit 2 and LD package 8 shown in FIG. 2.

Referring to FIG. 7, LD package 8 includes a laser diode 10 and a pin diode 9 for detecting the quantity of light emitted from laser diode 10. Pin diode 9 is generally provided in the direction opposite to the direction of the optical output of laser diode 10. A CPU 36 provided at laser driving circuit 2 outputs a digital signal indicating the driving current value I of laser diode 10 to a D/A (Digital/Analogue) converter 39, the analogue output of which is amplified at an operational amplifier 35 for application to the base of a transistor 33. Transistor 33 is provided between a power supply line Vcc and laser diode 10, and semiconductor laser 10 is driven with an emitter current according to the base current of transistor 33.

A transistor 41 having an emitter grounded is connected to a connection point of transistor 33 and laser diode 10. The base of transistor 41 is provided with a switch signal LDATA attaining an "L" level in a timing for driving laser diode 10 and turning off transistor 41.

Pin diode 9 is connected in the opposite direction to power supply line Vcc through a resister 34 and has an anode grounded and a cathode connected to an A/D (Analogue/Digital) converter 40. The potential of the cathode is determined based on the quantity of light received by pin diode 9 or the quantity of light emitted from laser diode 10.

The digital output of A/D converter 40 is input to CPU 36 and used for automatically controlling the intensity of the laser diode emission. Connected to CPU 36 are an ROM 37 storing programs executed by CPU 36, and an RAM 38 storing results of operations.

In order to set a beam intensity according to a beam diameter, data BDATA ($B_2$, $B_1$, $B_0$) determining a beam diameter produced based on image data is input to the input port of CPU 36. Driving current I for the laser diode is determined based on BDATA as illustrated in FIG. 6. The data is stored in ROM 37. The value of each driving current I is stored as a 8-bit digital value ($X_7$, $X_6$, . . . , $X_0$).

A laser beam is actually emitted as follows. A value for 8-bit data ($X_7$, $X_6$, . . . , $X_0$) corresponding to a value for driving current I is output in response to a value for BDATA ($B_2$, $B_1$, $B_0$), and converted into an analogue value at D/A converter 39. The analogue value is amplified at operational amplifier 35, and then converted into driving current I for laser diode 10.

Figure 8:
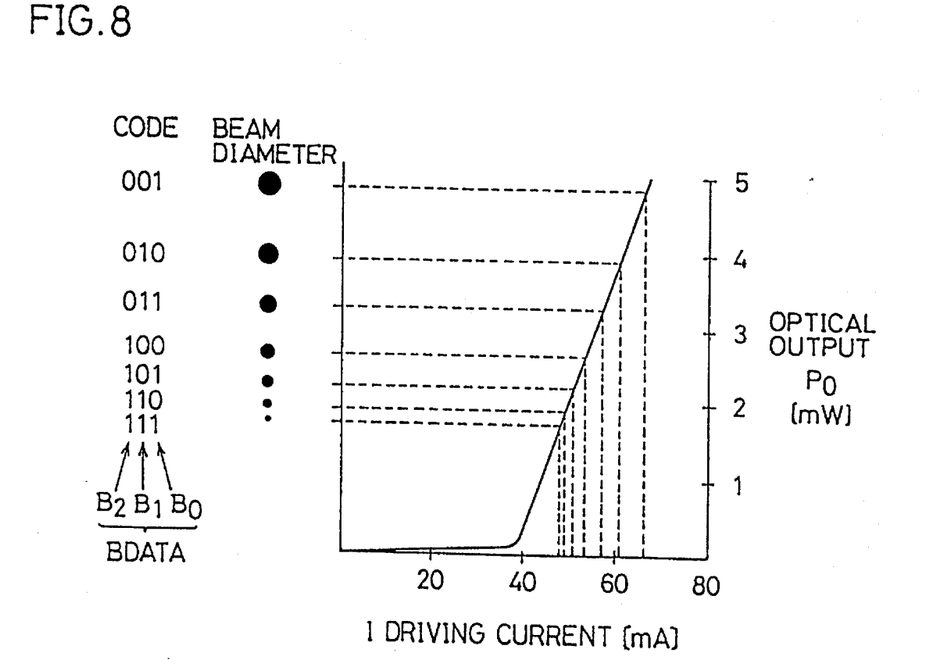
FIG. 8 is a representation for use in illustration of the relation between beam diameters, optical outputs and laser diode driving currents.

The relation between driving current I for the laser diode, optical output $P_0$ and the beam diameter will be described. FIG. 8 is a representation showing one example of the relation between these variables. In the example, the beam diameter varies in seven steps in FIG. 6.

Referring to FIG. 8, in order to keep the amount of sticking toner per unit area as constant as possible, currents of 48 mA, 49 mA, 51 mA, 53 mA, 57 mA, 61 mA, and 66 mA are passed across the laser diode for beam diameters from the smallest one in an ascending order. These values for driving current I may be appropriately set based on respective conditions (process, laser diode characteristic, optical system characteristic). A value for driving current I for each beam diameter may independently be adjusted. Each of the value I may be set so that an image can properly be reproduced on paper.

Figure 9A:
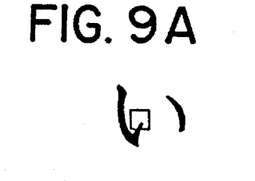
FIGS. 9A–9E and FIGS. 10A–10B are representations for use in illustration of the effect of the invention.
Figure 9B:
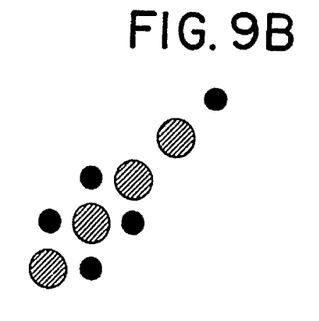
Figure 9C:
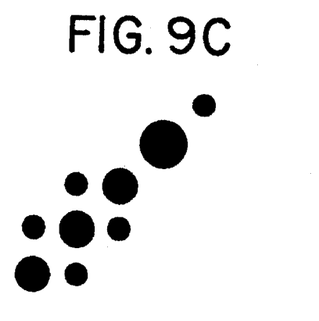
Figure 9D:
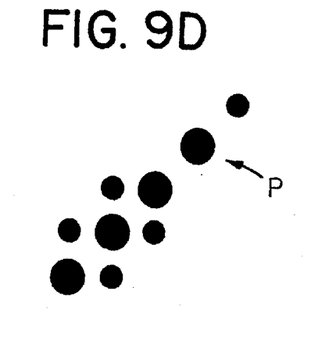
Figure 9E:
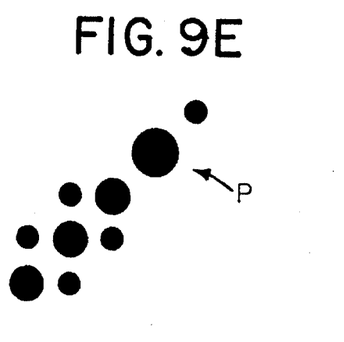
Figure 10A:
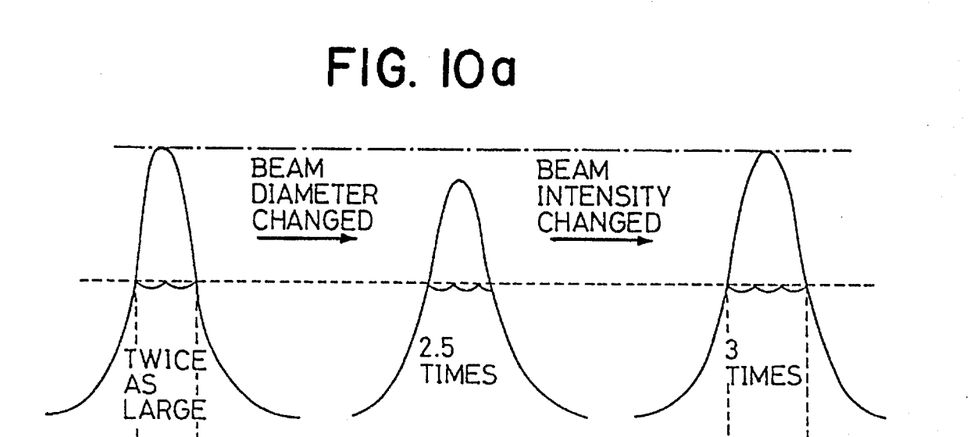
Figure 10B:
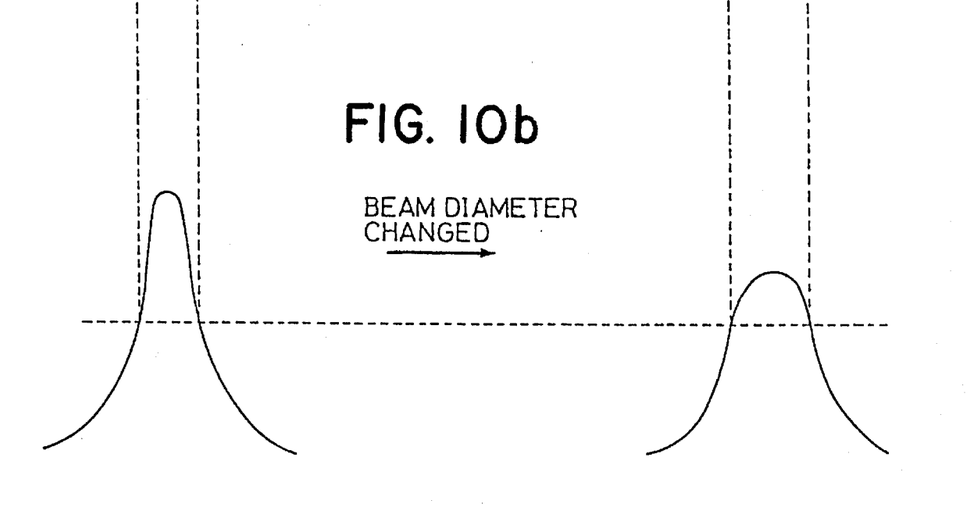
Figure 11A:
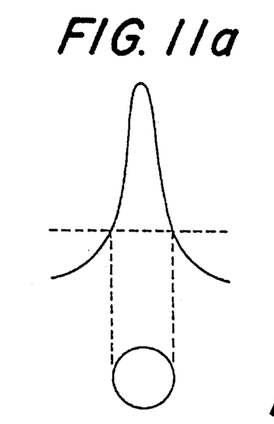
FIGS. 11a–11d are representations showing the amount of jitter generated for a small beam diameter.
Figure 11B:
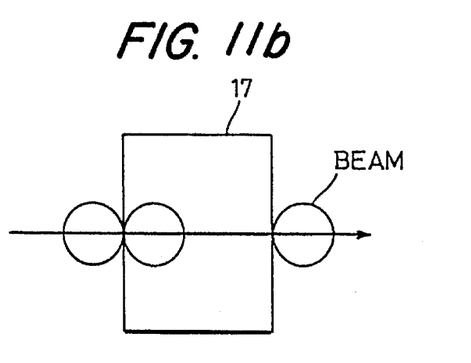
Figure 11C:
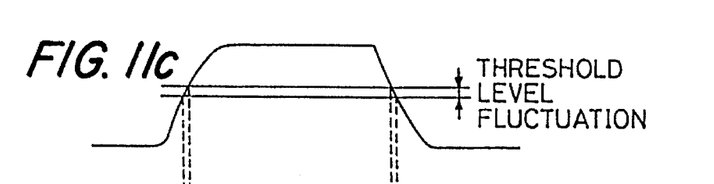
Figure 11D:
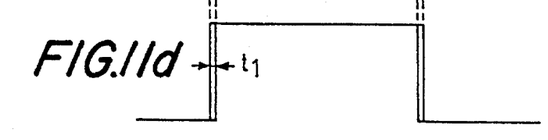
Figures 12A, 12B, 12C, 12D:
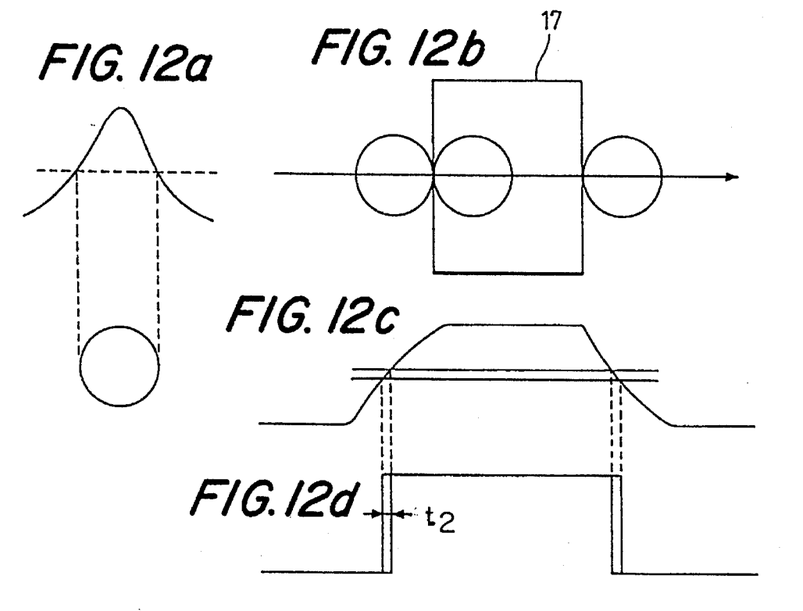
FIGS. 12a–12d are representations showing the amount of jitter generated for a large beam diameter.

Effects brought about according to invention will be described specifically in conjunction with FIGS. 9A–9E and FIGS. 10a–10b. FIGS. 9A–9E include enlarged views for a region of a Japanese character "い" in box in FIG. 9A, and FIGS. 10a–10b are representations showing in comparison the relation between beam diameters and beam intensities according to the present invention (A) and a conventional one (B). FIGS. 9A–9E show the case of a conventional laser beam printer at (B) and, at (C) the case according to the present invention. Referring to (B) and (C) in FIGS. 9A–9E, simply increasing the beam diameter in the conventional laser beam printer decreases the intensity of the beam at the peak of the intensity distribution as illustrated in FIGS. 10a–10b at (B). As a result, sufficient charging is not provided on the photoreceptor, the sticking of toner degrades, and the large beam results a thin image as illustrated in FIG. 9 (B).

In contrast, according to the present invention, when the beam diameter is changed, the beam intensity is changed as well as illustrated in FIGS. 10a–10b at (A), an equal peak value is obtained for the beams in the intensity distribution. Accordingly, if the beam diameter is enlarged, the density of a formed dot is kept at a consent value irrespective of the size of the dot as shown in FIGS. 9A–9E at (C).

Note that as the illustrated in FIG. 9 at (D), simply changing the beam intensity cannot control the beam diameter, because the beam has a constant intensity distribution, and therefore the pixel indicated by the arrow P in the figure cannot be enlarged. In contrast, as illustrated at (E) in FIGS. 9A–9E, according to the present invention, the size of a desired pixel can be enlarged in a constant density.

Referring to FIGS. 11a–11d and 12a–12d, a description follows on the effects brought about by minimizing the beam diameter when the above-described forced light emitting signal is output. In FIGS. 11a–11d and 12a–12d, (a) shows the intensity distribution of a laser beam corresponding to a beam diameter. In FIGS. 11a–11d (b) when a laser beam comes into SOS sensor 17 and a scanning is conducted in the direction of→ in the figure, SOS sensor 17 output a waveform as at (c). This is shaped into a signal SOS as shown at (d) in waveform shaping circuit 18. A starting position for writing in the scanning direction is determined in synchronization with signal SOS in image control circuit 1.

When the waveform at (c) in FIGS. 11a–11d is shaped into signal SOS at (d), the threshold level can sometimes fluctuate as shown due to fluctuations in power supply voltage, ripple and the like. Beam power fluctuations can sometimes fluctuate the apparent beam diameter, and jitter as shown in $t_1$ at (d) is generated.

FIGS. 12a–12d are representations corresponding to FIGS. 11a–11d in the case of a larger beam diameter. As can be seen from FIGS. 11 and 12 at (d), the beam with the smaller diameter with the earlier rising of waveform (c) has less jitter ($t_1 < t_2$) and a better image can be obtained.

Note that in the above-described embodiments, the position of initiating recording onto the photoreceptor is controlled with the SOS sensor, an EOS (End of Scan) sensor may be employed for detection.

In the above-described embodiments, the collimator lens is moved for changing the beam diameter, but alternatively the diameter of the collimator lens may be changed by a liquid crystal shutter provided immediately after the collimator lens, or an electrooptic ceramic plate as disclosed in Japanese Patent Laying Open No. 3-136018 may be used. Such alternatives will be described below.

Figure 13:
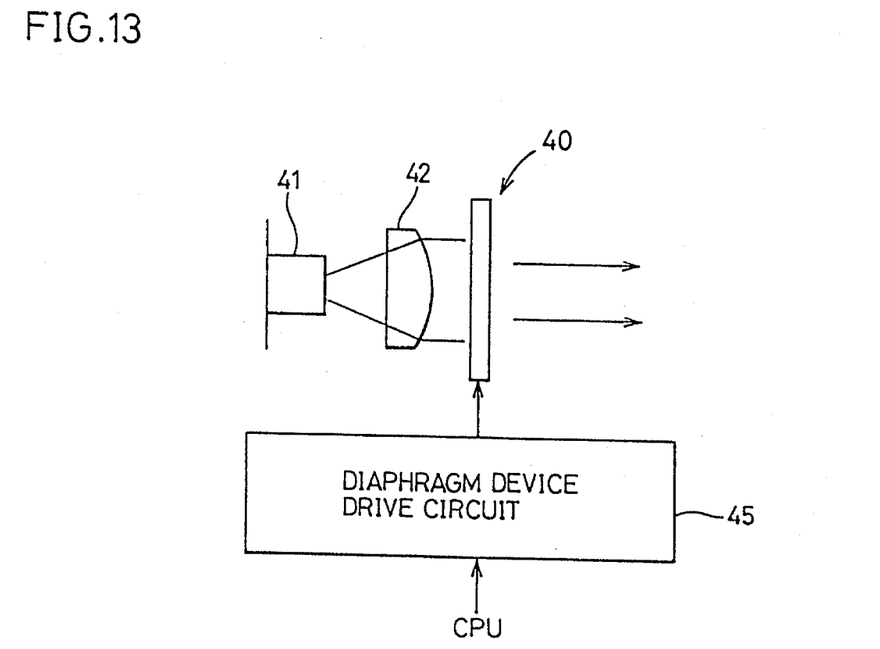
FIGS. 13 and 14 are representations showing another embodiment for changing a beam diameter.
Figure 14:
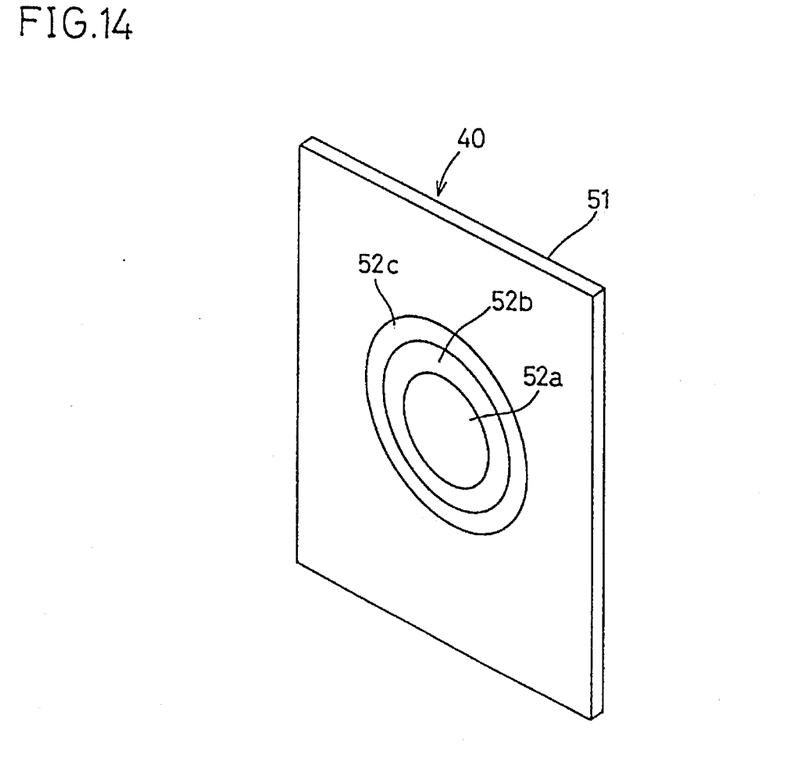

FIGS. 13 and 14 show changing mechanisms for correcting the beam diameter according to other embodiments. Referring to FIGS. 13 and 14, a changing mechanism includes a liquid crystal diaphragm device 40 disposed in the rear of collimator lens 42, a drive circuit 45 for the diaphragm device. Liquid crystal diaphragm device 40 includes a liquid crystal holding plate 51, and concentric circular electrodes 52, 52, 52 which are provided in opposite pairs on the front and rear sides of plate 51, respectively. In response to a signal from the CPU of image control circuit 1, current is passed through electrodes 52, 52, 52 under the control of drive circuit 45, such that when the current is passed through the pair of electrodes 52, 52 or 52, the laser beam is blocked at the corresponding position. Since the beam diameter on the photosensitive drum is in inverse proportion to the diaphragm aperture size owing to a beam diffraction effect, the diaphragm aperture is diminished for low density portions and enlarged for high density portions. Stated more specifically, electrodes 52, 52, 52 are held off for a current value I3 for the darkest tone, electrodes 52 are on for a current value I2, and electrodes 52, 52 are on for a current value I1. On the other hand, the laser beam is completely blocked when the current is passed through all the electrodes 52, 52, 52, so that diaphragm device 40 also serves as a safety device for preventing leakage of the beam, for example, during maintenance.

Although the voice coil or liquid crystal diaphragm device 40 is used as a device for changing the diameter of the laser beam, a mechanical diaphragm device for use in cameras may be used instead. Basically, the laser beam optical system including fφ lens 16 or the like can be of optical construction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical apparatus, comprising:

laser beam generation means;

beam diameter changing means for changing the beam diameter of a laser beam generated by said laser beam generation means;

intensity changing means for changing the intensity of said laser beam; and first control means for controlling said intensity changing means to change the intensity of said laser beam in response to change of a beam diameter by said beam diameter changing means.

2. An optical apparatus as recited in claim 1, wherein said beam diameter changing means includes a lens and moving means for moving said lens in an optical axis.

3. An optical apparatus as recited in claim 2, wherein said moving means includes a voice coil holding said lens.

4. An optical apparatus as recited in claim 1, further comprising:

second control means for controlling said beam diameter changing means to change the diameter of a laser beam generated by said laser beam generation means according to image data;

scanning means for scanning with said laser beam;

a sensor for detecting the laser beam scanned by said scanning means and producing an operation timing for said second control means; and setting means for setting the diameter of said laser beam to a predetermined diameter when said laser beam scans said sensor.

5. An optical apparatus as recited in claim 4, wherein said setting means sets the diameter of said laser beam to a minimum diameter when said laser beam scans said sensor.

6. An optical apparatus as recited in claim 1 further including a second control means for controlling said beam diameter changing means to change the diameter of a laser beam in response to image data.

7. An optical apparatus as defined in claim 1, wherein said first control means controls said intensity changing means to change said intensity so that the amount of sticking toner per unit area is constant irrespective of the diameter of said beam.

8. An optical apparatus comprising:

laser beam generation means for generating a laser beam;

scanning means for scanning with said laser beam;

means for modulating the laser beam with image data;

beam diameter changing means for changing the beam diameter of a laser beam generated by said laser beam generation means;

intensity changing means for changing the intensity of said laser beam;

first control means for controlling said intensity changing means to change the intensity of said laser beam in response to change of a beam diameter by said beam diameter changing means;

second control means for controlling said beam diameter changing means to change the diameter of a laser beam generated by said laser beam generation means according to image data;

a sensor for detecting the laser beam scanned by said scanning means and producing an operation timing for said second control means; and setting means for setting the diameter of said laser beam to a predetermined diameter when said laser beam scans said sensor.

9. An optical apparatus as recited in claim 8, wherein said setting means sets the diameter of said laser beam to a minimum diameter when said laser beam scans said sensor.

10. An optical apparatus, comprising:

laser beam generation means;

beam diameter changing means for changing the beam diameter of a laser beam generated by said laser beam generation means;

intensity changing means for changing the intensity of said laser beam;

first control means for controlling said intensity changing means to change the intensity of said laser beam in response to change of a beam diameter by said beam diameter changing means;

means for scanning the laser beam;

a sensor to detect the laser beam generated by said laser beam generating means to establish an operational timing for scanning; and means for setting a predetermined size and intensity to the laser beam as it scans said sensor.

11. The optical apparatus as defined in claim 10, wherein said beam diameter changing means includes a lens and moving means for moving said lens in an optical axis.

12. The optical apparatus as defined in claim 10, wherein said moving means includes a voice coil holding said lens.

13. An optical apparatus, comprising:

laser beam generation means;

beam diameter changing means for changing a beam diameter of a laser beam generated by said laser beam generation means and providing digital data representative of the beam diameter;

intensity changing means for changing the intensity of said laser beam; and computer control means for controlling said intensity changing means to change the intensity of said laser beam in response to change of a beam diameter by said beam diameter changing means, including a memory means for storing data corresponding to values of driving current for driving said intensity changing means that is addressed in response to said data representative of the beam diameter.

* * * * *